United States Patent
LaChapelle et al.

(10) Patent No.: US 7,668,842 B2
(45) Date of Patent: Feb. 23, 2010

(54) PLAYLIST STRUCTURE FOR LARGE PLAYLISTS

(75) Inventors: Kevin Leigh LaChapelle, Redmond, WA (US); Brian James Walker, Duvall, WA (US); Ian Cameron Mercer, Sammamish, WA (US); Hiroshi Kase, Moriguchi (JP); Harutoshi Miyamoto, Ibaraki (JP); Tomotaka Yagi, Nishinomiya (JP); Yasuyuki Torii, Yawata (JP); Nobuyasu Takeguchi, Kawachinagano (JP)

(73) Assignees: Microsoft Corporation, Redmond, WA (US); Panasonic Corporation, Osaka (JP)

( * ) Notice: Subject to any disclaimer, the term of this patent is extended or adjusted under 35 U.S.C. 154(b) by 332 days.

(21) Appl. No.: 11/168,060

(22) Filed: Jun. 28, 2005

(65) Prior Publication Data

US 2006/0020609 A1    Jan. 26, 2006

Related U.S. Application Data

(63) Continuation-in-part of application No. 10/273,415, filed on Oct. 17, 2002, now Pat. No. 7,043,477.

(60) Provisional application No. 60/418,973, filed on Oct. 16, 2002.

(51) Int. Cl.
*G06F 17/00*  (2006.01)
*G06F 7/00*  (2006.01)
(52) U.S. Cl. ........................ 707/100; 707/101; 707/102
(58) Field of Classification Search ........................ None
See application file for complete search history.

(56) References Cited

U.S. PATENT DOCUMENTS

| 5,428,732 A | 6/1995 | Hancock et al. |
| 5,616,876 A | 4/1997 | Cluts |
| 5,742,347 A | 4/1998 | Kandlur et al. |
| 5,870,553 A | 2/1999 | Shaw et al. |
| 5,892,535 A | 4/1999 | Allen et al. |

(Continued)

FOREIGN PATENT DOCUMENTS

EP    1288942 A1    3/2003

(Continued)

OTHER PUBLICATIONS

Hu et al., "Multimedia Description Framework (MDF) for content description of Audio/Video Documents," Proceedings of the fourth ACM conference on Digital libraries, 1999, pp. 67-75, ACM Press, New York, U.S.A.

(Continued)

*Primary Examiner*—Tony Mahmoudi
*Assistant Examiner*—Jacob F Bétit
(74) *Attorney, Agent, or Firm*—Senniger Powers LLP

(57) ABSTRACT

Enabling efficient navigation of a playlist of media files stored on a computer-readable medium. Aspects of the invention define a playlist structure to have one or more playlist units. Each playlist unit identifies one or more media files in the playlist and includes metadata for the media files. A consumer electronic device retrieves the playlist units and displays the metadata contained therein to a user to enable navigation of the playlist. Aspects of the invention reduce the memory requirements of the consumer electronic devices and reduce the quantity of disk seek operations needed for playlist navigation.

18 Claims, 6 Drawing Sheets

U.S. PATENT DOCUMENTS

| | | | |
|---|---|---|---|
| 5,996,015 | A | 11/1999 | Day et al. |
| 6,006,234 | A | 12/1999 | Govindarajan et al. |
| 6,199,059 | B1 | 3/2001 | Dahan et al. |
| 6,201,540 | B1 | 3/2001 | Gallup et al. |
| 6,212,524 | B1 | 4/2001 | Weissman et al. |
| 6,240,407 | B1 | 5/2001 | Chang et al. |
| 6,256,031 | B1 | 7/2001 | Meijer et al. |
| 6,263,341 | B1 | 7/2001 | Smiley |
| 6,269,394 | B1 | 7/2001 | Kenner et al. |
| 6,282,548 | B1 | 8/2001 | Burner et al. |
| 6,311,194 | B1 | 10/2001 | Sheth et al. |
| 6,356,921 | B1 | 3/2002 | Kumar et al. |
| 6,363,377 | B1 | 3/2002 | Kravets et al. |
| 6,389,426 | B1 | 5/2002 | Turnbull et al. |
| 6,405,215 | B1 | 6/2002 | Yaung |
| 6,430,575 | B1 | 8/2002 | Dourish et al. |
| 6,449,341 | B1 | 9/2002 | Adams et al. |
| 6,484,156 | B1 | 11/2002 | Gupta et al. |
| 6,526,411 | B1 | 2/2003 | Ward |
| 6,557,042 | B1 | 4/2003 | He et al. |
| 6,657,117 | B2 | 12/2003 | Weare et al. |
| 6,661,437 | B1 | 12/2003 | Miller et al. |
| 6,721,489 | B1 | 4/2004 | Benyamin et al. |
| 6,728,729 | B1 | 4/2004 | Jawa et al. |
| 6,735,628 | B2 | 5/2004 | Eyal |
| 6,760,721 | B1 | 7/2004 | Chasen et al. |
| 6,839,059 | B1 | 1/2005 | Anderson et al. |
| 7,136,874 | B2 | 11/2006 | Mercer et al. |
| 2001/0001160 | A1 | 5/2001 | Shoff et al. |
| 2001/0011284 | A1 | 8/2001 | Humpleman et al. |
| 2001/0018727 | A1* | 8/2001 | Ando et al. ................. 711/112 |
| 2002/0026521 | A1 | 2/2002 | Sharfman et al. |
| 2002/0033844 | A1 | 3/2002 | Levy et al. |
| 2002/0078144 | A1 | 6/2002 | Lamkin et al. |
| 2002/0082730 | A1 | 6/2002 | Capps et al. |
| 2002/0093886 | A1 | 7/2002 | Ijichi et al. |
| 2002/0122137 | A1 | 9/2002 | Chen et al. |
| 2002/0147728 | A1 | 10/2002 | Goodman et al. |
| 2002/0151363 | A1 | 10/2002 | Letovsky et al. |
| 2002/0161911 | A1 | 10/2002 | Pinckney, III et al. |
| 2002/0172495 | A1 | 11/2002 | Han |
| 2002/0180803 | A1 | 12/2002 | Kaplan et al. |
| 2003/0009452 | A1 | 1/2003 | O'Rourke et al. |
| 2003/0016950 | A1 | 1/2003 | Ando et al. |
| 2003/0023975 | A1 | 1/2003 | Schrader et al. |
| 2003/0028505 | A1 | 2/2003 | O'Rourke et al. |
| 2003/0108335 | A1 | 6/2003 | Nakamura et al. |
| 2003/0151618 | A1 | 8/2003 | Johnson et al. |
| 2004/0001106 | A1 | 1/2004 | Deutscher et al. |
| 2004/0003398 | A1 | 1/2004 | Donian et al. |
| 2004/0019396 | A1* | 1/2004 | McMahon et al. ............ 700/94 |
| 2004/0064476 | A1 | 4/2004 | Rounds |
| 2004/0236568 | A1* | 11/2004 | Guillen et al. .............. 704/201 |
| 2006/0242106 | A1 | 10/2006 | Bank |

FOREIGN PATENT DOCUMENTS

| | | |
|---|---|---|
| JP | 05-325500 | 10/1993 |
| JP | 2002-100161 A | 4/2002 |
| JP | 2002-117649 A | 4/2002 |
| JP | 2002329385 A1 | 11/2002 |
| WO | WO 01/28222 A2 | 4/2001 |
| WO | 0186652 A1 | 11/2001 |
| WO | 03/023781 A1 | 3/2003 |
| WO | WO 03/023781 A1 | 3/2003 |

OTHER PUBLICATIONS

Mueller, "Mediacaptain—an Interface for Browsing Streaming Media," Proceedings of the eighth ACM international conference on Multimedia, 2000, p. 419-421, ACM Press, New York, U.S.A.

Crossen et al., "Flytrap: Intelligent Group Music Recommendation," Proceedings of the 7th international conference on Intelligent user interfaces, 2002, pp. 184-185, ACM Press, New York, U.S.A.

Dunne et al., "mpME!: Music Recommendation and Exploration," Proceedings of the 7th international conference on Intelligent user interfaces, 2002, p. 235, ACM Press, New York, U.S.A.

Unknown, "What is MPV?," Specifications: MPV, 2001, 2 pages, Optical Storage Technology Association, U.S.A.

Unknown, "Creating and Using Playlists," Windows Media, 2005, 2 pages, Microsoft Corporation, U.S.A.

Unknown, "To Create a Playlist Using the Windows Media Playlist Editor," Windows Media Services 9 Series, 2000-2003, 2 pages, Microsoft Corporation, U.S.A.

Notification of Transmittal of The International Search Report and the Written Opinion of the International Searching Authority in International Application No. PCT/US06/15962, dated Oct. 12, 2007, 9 pgs.

* cited by examiner

PLAYLIST STRUCTURE FOR LARGE PLAYLISTS

CROSS-REFERENCE TO RELATED APPLICATION

This application is a continuation-in-part of co-pending U.S. patent application Ser. No. 10/273,415, filed Oct. 17, 2002, entitled "Navigating Media Content via Groups within a Playlist," hereby incorporated by reference, which claims the benefit of U.S. Provisional Patent Application Ser. No. 60/418,973, filed Oct. 16, 2002, entitled "COMPRESSED MEDIA FORMAT SPECIFICATION," now abandoned.

BACKGROUND

Due to recent advances in technology, computer users are now able to enjoy many features that provide an improved user experience, such as playing various media and multimedia content on their personal or laptop computers. For example, most computers today are able to play compact discs (CDs) so users can listen to their favorite musical artists while working on their computers. Many computers are also equipped with digital versatile disc (DVD) drives enabling users to watch movies.

In some multimedia environments, a computer has access to a computer-readable medium storing compressed media files such as Moving Picture Experts Group audio layer-3 (MP3) files and WINDOWS MEDIA technologies audio (WMA) files. When the media files are rendered on a computer, the computer typically has access to a database storing metadata describing albums, artists, genres, years, or the like for the media files. The computer typically organizes the media files into playlists based on the metadata when the compressed media files are played on the computer. For example, in the case of audio media files, the files may be organized by album, artist, genre, year, or some user specified selection and ordering. This allows users to easily have access to all of their content regardless of whether or not the users manually created a playlist.

However, when compressed media files are transferred from the computer to an optical format such as CD or DVD for playback on a portable CD player, car receiver, DVD player or other consumer electronic devices having a low-power processor, limited memory and often limited display and user input capabilities, the media files traditionally lose much of the functionality offered by metadata databases hosted on devices with greater computing power. The playlists revert to nothing more than a sequential list of files to be played.

Further, a playlist having a large number of files is difficult for a low-powered device to navigate. For example, some existing systems store metadata separate from media files on a computer-readable medium. To render the media files and display metadata associated with the media files, the existing systems have to seek to at least two separate areas of the computer-readable medium. If the rendering device has a limited buffer for disk seek and find operations, then such rendering devices cannot navigate large playlists. For example, a rendering device such as a low end portable CD player only contains an 8 bit 1 MHz processor with 100 kilobytes of working memory with a five second seek time.

Other systems store the metadata within the media files. To obtain the metadata for the media files, the existing systems have to open each media file in the playlist to obtain and display the metadata. Opening every media file in a playlist is slow and increases complexity. The existing systems fail to provide a playlist structure that supports an unbounded number of media files and is capable of playback on even the lowest power devices.

Accordingly, a system for enabling efficient navigation of large playlists is desired to address one or more of these and other disadvantages.

SUMMARY

Embodiments of the invention include a playlist structure in which references to content within the playlist are stored along with metadata associated with the content in self-contained, easy to parse, fixed-size playlist blocks, chunks, units, or other discrete elements. Metadata is preserved when storing playlists on a computer-readable medium for access by a consumer electronic device having a low-power processor, limited memory and limited display and user input capabilities. The playlist units have a size that is aligned to a sector size of the computer-readable medium (e.g., CD or DVD) to enable efficient loading by the consumer electronic device. A low-end rendering device or software need only load one or more playlist units into memory to acquire and process the complete metadata and playlist. In one embodiment, the metadata stored in the playlist units includes file and directory information for the media files, metadata for each of the media files, and specific playlist data for rendering those files.

By storing the metadata and the media file references in easy-to-load playlist units, aspects of the invention reduces the number of disk seek and find operations. These aspects of the invention also enable rendering devices with low-power or limited memory to process and navigate large playlists.

Alternatively, aspects of the invention may comprise various other methods and apparatuses.

Other features will be in part apparent and in part pointed out hereinafter.

Figure 1:
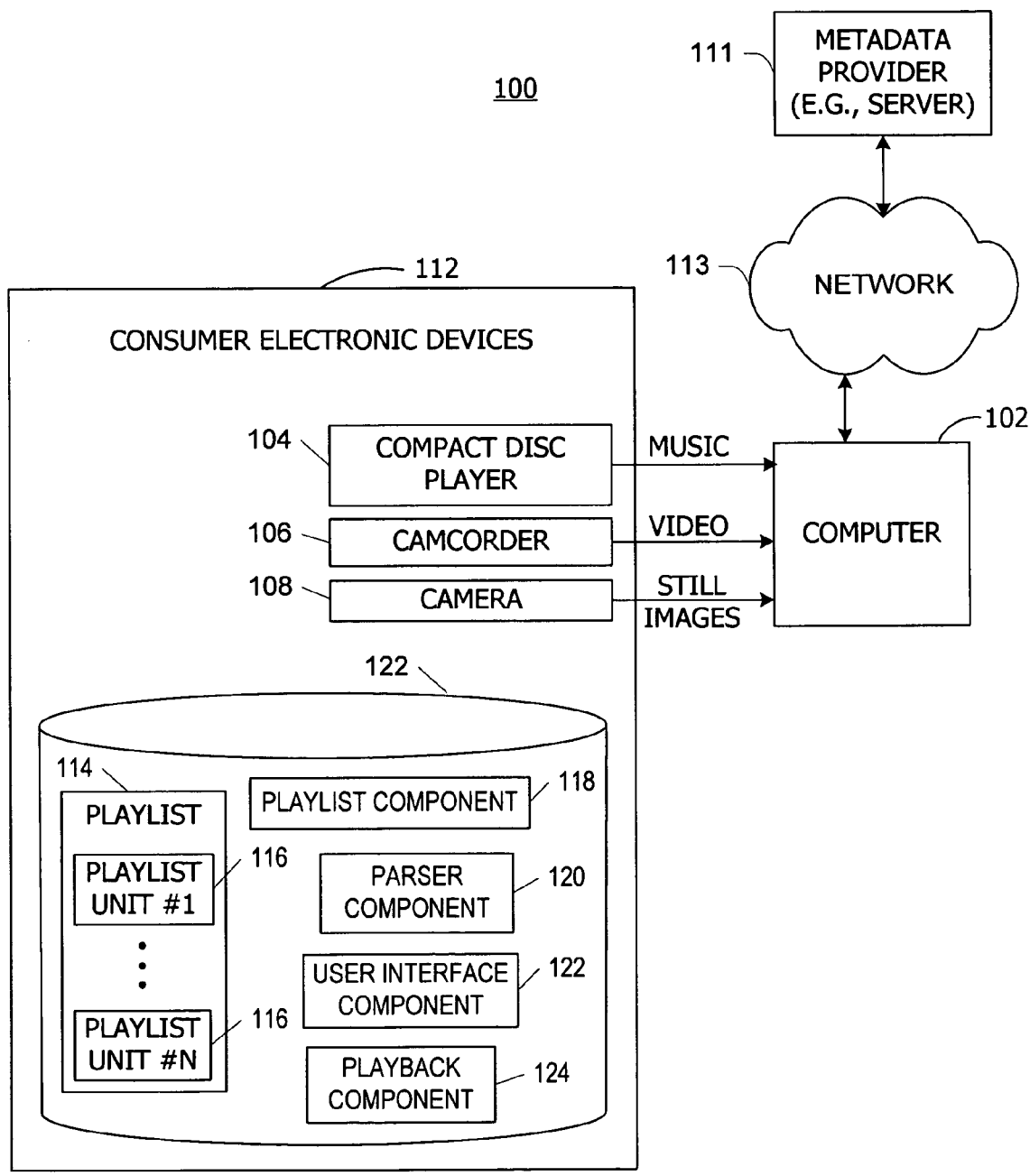
FIG. 1 is a block diagram illustrating an exemplary media environment in which the invention may be implemented.

Appendix A includes exemplary group data for the playlist structure of aspects of the invention.

Corresponding reference characters indicate corresponding parts throughout the drawings.

DETAILED DESCRIPTION

Referring first to FIG. 1, a block diagram illustrates an exemplary media environment in which the invention may be implemented. A system 100 has one or more computers 102 coupled to one or more consumer electronic devices 112 providing media content including audio data, video data, and/or still image data. For example, the devices 112 may include a compact disc (CD) player 104, a camcorder 106, or a camera 108. Additionally, the devices 112 may include other personal computers, removable hard drives, network shares, a Moving Picture Experts Group audio layer-3 (MP3) player, an audio system in an automobile, a personal digital assistant, a cellular telephone, or the like. The consumer electronic devices 112 may include any suitable rendering filter or media player or device (e.g., a portable media device) that is configured to render digital media so that the user can experience the content that is embodied on the consumer electronic device 112. For example, suitable media player applications include a compact disc (CD) media player and a digital versatile disc or digital video disc (DVD) media player. The computer 102 also has rendering capability including a processor and rendering software (e.g., a media player).

One aspect of the present invention enables the user or, particularly, enables a media player program executing on computing device 112, to access, retrieve, and display for the user, so-called metadata. Those skilled in the art are familiar with metadata, which is simply information about data. In the context of the illustrated embodiment, metadata includes information related to specific content of a digital media file being played on the media player. Basic metadata includes, but is not limited to, title, performer, genre, track number, and the like. Extended metadata includes, but is not limited to, cover art, composer, description of content, performer biographies, reviews, ratings, related performers, where to buy similar items, upcoming concerts, ticket sales, URLs to other related experiences including purchase opportunities, studio, director, and the like. In one embodiment, extended metadata may be organized into two main categories: metadata retrieved or downloaded, and metadata computed from the media file (e.g., digital signal processing of the file stream). The metadata may be stored within the media file or stored in another file accessible and known to the media file.

In one example, additional metadata is available from the metadata provider 111 via a data communication network 113. The computer 102 and metadata provider 111 are coupled to the data communication network 113. While the network 113 includes the Internet in one example, the teachings of the invention may be applied to any data communication network. Data communication network 113 may support, for example, client/server communications or peer-to-peer connections.

The consumer electronic devices 112 or computer 102 may have access to one or more computer-readable media (e.g., memory area 122). While the memory area 122 is illustrated to be part of any of the consumer electronic devices 112 in FIG. 1, the memory area 122 may be separate from the consumer electronic devices 112 yet accessible to the consumer electronic devices 112, for example, via a network. In one embodiment, memory area 122 includes one or more computer-readable media for storing playlists 114. In FIG. 1, a playlist 114 has playlist units 116 such as playlist unit #1 through playlist unit #N. Each of the playlist units 116 includes a content entry field (not shown) such as a 'content entry' field in FIG. 2 for each of the media files associated with the playlist unit 116 and a metadata field (not shown) such as an 'offset to text1' field in FIG. 2 for each content entry field. The content entry field stores a media file reference identifying a location of the media file. The metadata field stores metadata associated with the media file associated with the content entry field. The playlist structure is described in further detail with reference to FIG. 2 below.

In one embodiment, the consumer electronic devices 112 (e.g., a portable media device) are configured to execute computer-executable instructions for navigating the playlist 114 having a plurality of media files associated therewith. The computer-executable instructions may be organized into one or more components. For example, the consumer electronic devices 112 may store a playlist component 118, a parser component 120, a user interface component 122, and a playback component 124. The playlist component 118 retrieves, obtains, or otherwise receives one of a plurality of playlist units 116 stored in memory area 122. The playlist units 116 collectively represent the playlist 114. The parser component 120 obtains metadata stored within the playlist unit 116 retrieved by the interface component. The metadata describes a media file associated with the playlist 114. The user interface component 122 displays, to a user, the obtained metadata or a portion thereof to enable user selection of a media file associated with the displayed metadata. The user interface component 122 receives a media file selection from the user. The playback component 124 renders the selected media file to the user via the media file reference associated with the media file selection. In one embodiment, each of the playlist units 116 has a size derived from a sector size associated with the memory area.

The computer 102, or other device or software, also has one or more exemplary modules or components for implementing aspects of the invention. For example, the computer 102 may have computer-executable instructions for creating playlist 114 which has an efficient structure described herein to enable efficient navigation of the playlist 114. Such computer-executable instructions are described in FIG. 3.

Those skilled in the art will note that the invention software may be implemented with any number and organization of components or modules. That is, the invention is not limited to the specific configuration of the playlist component 118, the parser component 120, the user interface component 122, the playback component 124, and the computer-executable instructions executed by computer 102, but may include more or less components having more or less individual functionality than described herein. Further, the invention may be embodied in hardware, software, or a combination thereof in a media player, operating system, DVD recorder, CD recorder, video camera, hard drive, flash drive, personal digital assistant, wireless device (e.g., cellular telephone), or the like.

Figure 2:
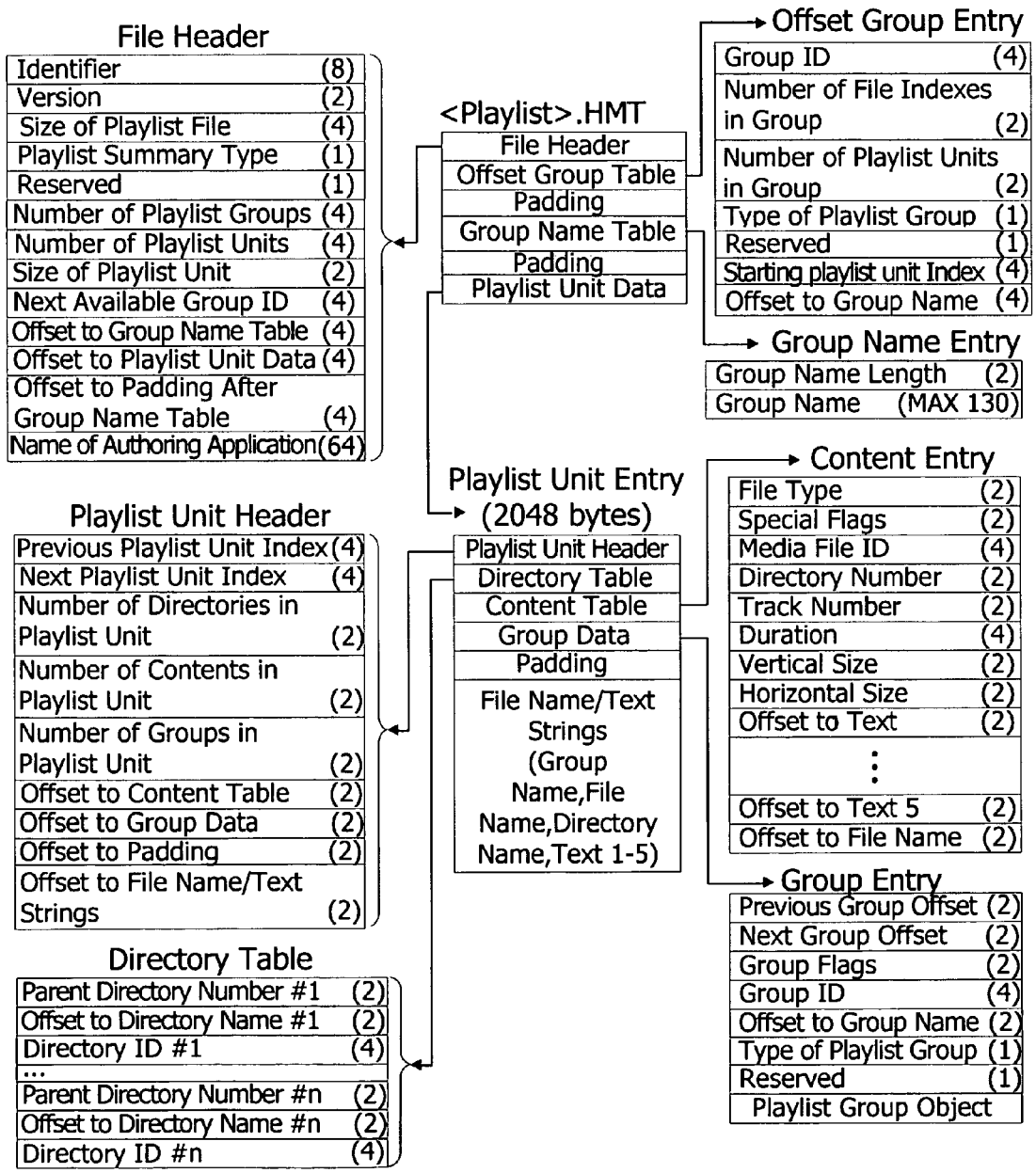
FIG. 2 is an exemplary block diagram illustrating a playlist structure.

Referring next to FIG. 2, an exemplary block diagram illustrates a playlist structure. In one embodiment, each playlist is represented as a unique <playlist>.HMT file such as nnnnnnnn.HMT file, where nnnnnnnn is an upper-case, string representation of a hexadecimal number without leading zeros that represents a playlist identifier. The playlists may contain one or more of the following media files; audio files, video files, image files (along with the minimum duration an image should be displayed as well as transitions to use between each image), and parallel images (e.g., an image slideshow with background audio). Further, in one embodiment, each playlist may be organized into groups. There are four different types of playlist groups: an audio playlist group, a video playlist group, a timed image playlist group, and a parallel image audio playlist group. Audio playlist groups have one or more audio files. Video playlist groups have one or more video files and support the ability to specify the starting and ending point to use when playing a video file. Timed image playlist groups have one or more image files and support the ability to specify the minimum duration an image should be displayed as well as transitions to use between each image. Parallel image audio playlist groups allow for an image slideshow with background audio.

The playlist structure in FIG. 2 generally includes a file header, an offset group table, a group name table, and playlist unit data. Playlists that are created on rewritable media also include padding to allow for future edits. For example, the padding may be after an offset group table as well as after the group name table. In one embodiment, the size of the padding is a minimum of 2,048 bytes for each padding section. If the playlist authoring software of the invention expects a large number of edits to be made to the playlist, an increased padding size may be warranted.

An exemplary file header is shown below.

TABLE 1

File Header.

| Offset | Length | Field Name |
| --- | --- | --- |
| 0 | 8 | Identifier |
| 8 | 2 | Version |
| 10 | 4 | Size of Playlist File |
| 14 | 1 | Playlist Summary Type |
| 15 | 1 | Reserved |
| 16 | 4 | Number of Playlist Groups |
| 20 | 4 | Number of Playlist units |
| 24 | 2 | Size of Playlist unit |
| 26 | 4 | Next Available Group ID |
| 30 | 4 | Offset to Group Name Table |
| 34 | 4 | Offset to Playlist unit Data |
| 38 | 4 | Offset to Padding After Group Name Table |
| 42 | 64 | Name of Authoring Application |

The identifier field is an 8-byte entry such as the text string "PLISTHMT". The version field is a 2-byte entry representing the compliant version of the specification to which this playlist file conforms. The 'size of playlist file' field is a 4-byte entry that includes the size of this <Playlist>.HMT file in bytes. The 'playlist summary type' field is a 1-byte entry that specifies the type of playlist (e.g., audio, video, timed image, or parallel image). The 'number of playlist groups' field is a 4-byte entry representing a quantity of playlist groups. The 'number of playlist units' field is a 4-byte entry representing a quantity of playlist units in this playlist file. The 'size of playlist unit' field is a 2-byte entry representing the byte size of the playlist units in this playlist file. The 'next available group ID' field is a 4-byte entry representing the next available group identifier in this playlist file. The 'offset to group name table' field is a 4-byte entry representing the byte offset from the beginning of the file to the beginning of the group name table. The 'offset to playlist unit data' field is a 4-byte entry representing the byte offset from the beginning of the file to the beginning of the playlist unit data. The 'offset to padding after group name table' field is a 4-byte entry representing the byte offset from the beginning of the file to the beginning of the padding after the group name table. The 'name of authoring application' field is a 64-byte entry representing the name of the authoring application.

The offset group table includes a list of one or more offset group entries. The offset group entries in the offset group table are listed in the playback order of the groups in the playlist file. An exemplary offset group entry is shown in the table below.

TABLE 2

Offset Group Entry.

| Offset | Length | Field Name |
| --- | --- | --- |
| 0 | 4 | Group ID |
| 4 | 2 | Number of File Indexes in Group |
| 6 | 2 | Number of Playlist units in Group |
| 8 | 1 | Type of Playlist Group |
| 9 | 1 | Reserved |

TABLE 2-continued

Offset Group Entry.

| Offset | Length | Field Name |
| --- | --- | --- |
| 10 | 4 | Starting Playlist unit Index |
| 14 | 4 | Offset to Group Name |

The 'group ID' field is a 4-byte entry representing the identifier of the group in this offset group entry. The 'number of file indexes in group' field is a 2-byte entry representing the number of media files referenced in this group. For example, a playlist group that references the files A, B and C in the following order A, B, C, B shall have a value of 4, not 3. The 'number of playlist units in group' field is a 2-byte entry representing the number of playlist units that contain this group. The 'type of playlist group' field is a 1-byte entry representing the type of the playlist group as defined in the following table.

TABLE 3

Playlist Group Type.

| Playlist Group Type | Value |
| --- | --- |
| 0 | Audio Playlist Group |
| 1 | Video Playlist Group |
| 2 | Timed Image Playlist Group |
| 3 | Parallel Image Audio Playlist Group |
| 4-255 | Reserved |

The 'starting playlist unit index' field is a 4-byte entry representing the index of the first playlist unit that contains this group. The 'offset to group name' field is a 4-byte entry representing a byte offset from the beginning of the playlist file to the group name length field.

The group name table includes a list of one or more group name entries. Each group name entry includes a group name using the following exemplary format.

TABLE 4

Group Name Entry.

| Offset | Length | Field Name |
| --- | --- | --- |
| 0 | 2 | Group Name Length |
| 2 | Variable | Group Name |

The 'group name length' field is a 2-byte entry representing the byte length of the group name. The 'group name' field is the text string group name.

Playlist units are fixed size blocks that reference one or more media files. In one embodiment, 10-15 media files are referenced in a single playlist unit. In an embodiment in which the playlist is further organized into playlist groups, a playlist unit may include one or more groups. Further, one playlist group may span multiple playlist units. Each of the playlist units includes data to render all or part of a playlist group. This data lowers the memory required for a player to render very large playlists. A player only needs to have enough memory to hold at least one playlist unit in memory at any given time.

An exemplary playlist unit includes a playlist unit header, a directory table, a content table, group data, and the file names of the content as shown below. Empty playlist units may be in the playlist file. An empty playlist unit only contains a playlist unit header where all fields are zero except for the previous and 'next playlist unit index' fields. Offsets inside a playlist unit are relative to the beginning of the playlist unit. This allows each playlist unit to be a self-contained unit that can be interpreted without any other information. For DVD media, the playlist unit size is 2,048 bytes corresponding to the sector size of a DVD medium. In addition, the playlist units are in playback order. While the playlist units have equal sizes in one embodiment, the invention is operable with playlists of differing sizes (e.g., multiples).

TABLE 5

Playlist Unit Structure.

Playlist Unit Header
Directory Table
Content Table
Group Data
Padding
File Name/Text Strings The file 'name/text string' field of each playlist unit is a contiguous section of bytes that contains the text data (e.g., metadata) for the files in the playlist unit. This text data includes, for example, file name, directory name, and text metadata for the files and associated group name in the playlist unit. Each of the strings is formatted as text data structures. In one embodiment, the authoring application of the invention conserves space by not adding duplicate strings to the 'file name/text string' field; instead, the authoring application references the one instance in the 'file name/text string area.'

An exemplary playlist unit header is shown below.

TABLE 6

Playlist Unit Header.

| Offset | Length | Field Name |
|---|---|---|
| 0 | 4 | Previous Playlist unit Index |
| 4 | 4 | Next Playlist unit Index |
| 8 | 2 | Number of Directories in Playlist unit |
| 10 | 2 | Number of Contents in Playlist unit |
| 12 | 2 | Number of Groups in Playlist unit |
| 14 | 2 | Offset to Content Table |
| 16 | 2 | Offset to Group Data |
| 18 | 2 | Offset to Padding |
| 20 | 2 | Offset to File Name/Text Strings |

The 'previous playlist unit index' field is a 4-byte entry representing the index of the playlist unit that precedes the current playlist unit. A value of zero indicates that the current playlist unit is the first playlist unit. The 'next playlist unit index' field is a 4 byte entry representing the index of the next playlist unit. A value of zero indicates that the current playlist is the last playlist unit. The 'number of directories in playlist unit' field is a 2-byte entry representing the number of directory table entries in the current playlist unit. The 'number of contents in playlist unit' field is a 2-byte entry representing the number of content entries contained in the current playlist unit. The 'number of group in playlist unit' field is a 2-byte entry representing the number of group contained in this playlist unit, including partial groups. The 'offset to content table' field is a 2-byte entry representing the byte offset from the beginning of the playlist unit to the content table. The 'offset to group data' field is a 2-byte entry representing the byte offset from the beginning of the playlist unit to the group data. The 'offset to padding' field is a 2-byte entry representing the byte offset from the beginning of the playlist unit to the padding. The 'offset to file name/text strings' field is a 2-byte entry representing the byte offset from the beginning of the playlist unit to the file name/text string data.

The directory table in a playlist unit as shown below only contains the directories that are referenced in the content table of the same playlist unit for memory storage optimization. The exemplary directory table below stores one or more directory paths associated with the media files in the playlist unit.

TABLE 7

Directory Table.

| Length | Field Name |
|---|---|
| 2 | Parent Directory Number #1 |
| 2 | Offset to Directory Name #1 |
| 4 | Directory ID #1 |
| . | |
| . | |
| . | |
| 2 | Parent Directory Number #n |
| 2 | Offset to Directory Name #n |
| 4 | Directory ID #n |

The 'parent directory number' field is a 2-byte entry representing the index in the directory table for the parent directory. The 'offset to directory name' field is a 2-byte entry representing the offset from the beginning of the current playlist unit to the text data for the directory name. The 'directory ID' field is a 4-byte entry representing a directory identifier this directory.

The content table includes a list of content entries. There is one content entry for each unique file referenced in a playlist unit. An exemplary content entry is formatted as defined in the table below.

TABLE 8

Content Entry.

| Offset | Length | Field Name |
|---|---|---|
| 0 | 2 | File Type |
| 2 | 2 | Special Flags |
| 4 | 4 | Media File ID |
| 8 | 2 | Directory Number |
| 10 | 2 | Track Number |
| 12 | 4 | Duration |
| 16 | 2 | Vertical Size |
| 18 | 2 | Horizontal Size |
| 20 | 2 | Offset to Text1 |
| 22 | 2 | Offset to Text2 |
| 24 | 2 | Offset to Text3 |
| 26 | 2 | Offset to Text4 |
| 28 | 2 | Offset to Text5 |
| 30 | 2 | Offset to File Name |

The 'file type' is a 2-byte entry representing the file type (e.g., the data encoding format and the file format). The 'special flags' field is a 2-byte entry summarizing the special attributes of this file. The 'media file ID' field is a 4-byte entry representing the identifier that corresponds to the current media file entry. The 'directory number' field is a 2-byte entry representing the index in the directory table for the directory that contains the current media file. A value of one indicates the first directory listed in the Directory Table. The 'track number' field is a 2-byte entry containing the track number of the audio file. A value of zero indicates no track number. Image files and video files have this field set to zero. The duration field is a 4-byte entry containing the duration of the current media file in milliseconds. Image Files have a value of zero. The 'vertical size' field is a 2-byte entry representing the vertical size of the image or video file in pixels. Audio files have a value of zero. The 'horizontal size' field is a 2-byte entry representing the horizontal size of the image or video file in pixels. Audio files have a value of zero.

In one embodiment, metadata associated with each media file is organized into fields such as text1, text2, text3, text4, and text5. The metadata in each of the text fields may represent a particular metadata such as album, artist, and movie title depending on the type of media file associated with the metadata. The 'offset to text1' field is a 2-byte entry representing the offset from the beginning of the current playlist unit to the text data for Text 1 data. The 'offset to text2' field is a 2-byte entry representing the offset from the beginning of the current playlist unit to the text data for text2 data. The 'offset to text3' field is a 2-byte entry representing the offset from the beginning of the current playlist unit to the text data for text3 data. The 'offset to text4' field is a 2-byte entry representing the offset from the beginning of the current playlist unit to the text data for text4 data. The 'offset to text5' field is a 2-byte entry representing the offset from the beginning of the current playlist unit to the text data for text5 data. The 'offset to file name' field is a 2-byte entry representing the offset from the beginning of the current playlist unit to the text data structure which contains the file name of the current media file.

An exemplary mapping of metadata to the text fields in a content entry is outlined in the following table.

TABLE 9

Text Mapping.

| | Audio Files | Image Files | Video Files |
| --- | --- | --- | --- |
| Text1 | Audio Title | Image Title | Video Title |
| Text2 | Artist Name | Creating Device Name | Artist Name |
| Text3 | Composer Name | Date Image Taken | Date |
| Text4 | Album Name | Event Name | Event Name |
| Text5 | Genre Name | Subject | Genre Name |

The 'group data' field is described in Appendix A.

Figure 3:
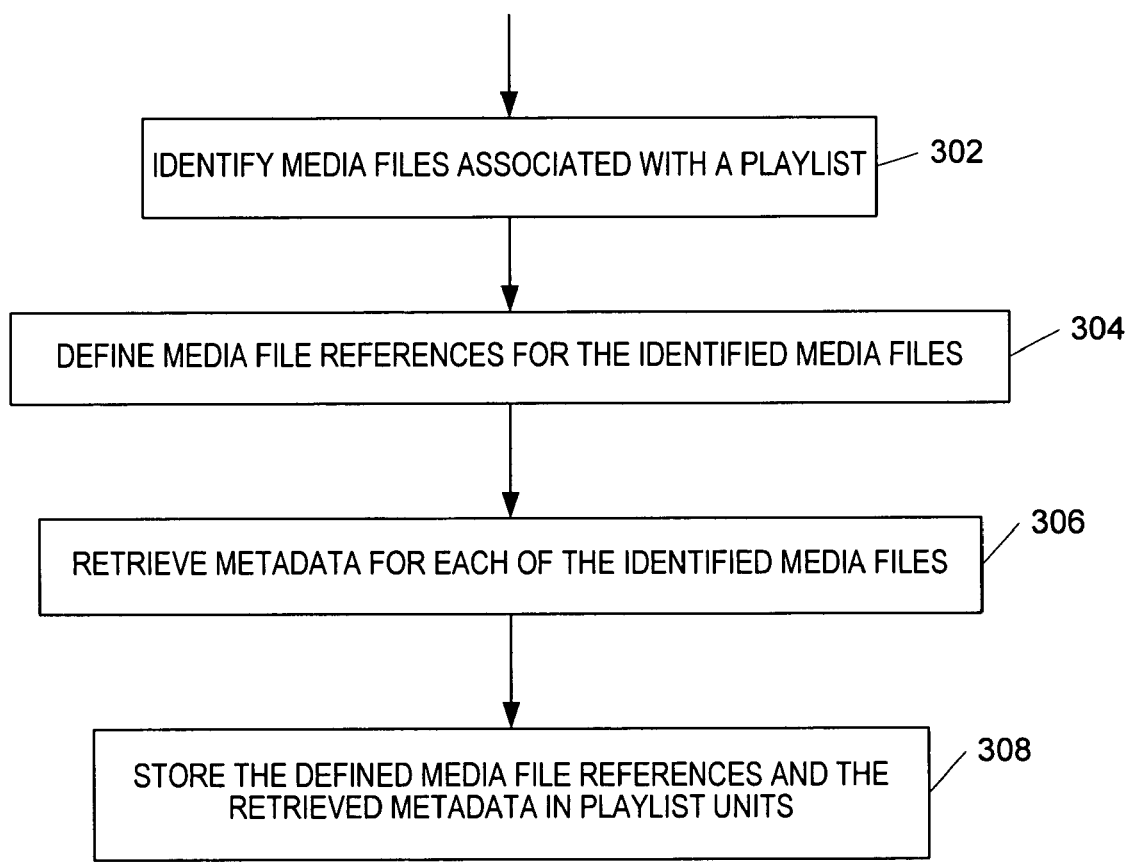
FIG. 3 is an exemplary flow chart illustrating operation of playlist creation software.

Referring next to FIG. 3, an exemplary flow chart illustrates operation of playlist creation software. The invention includes playlist creation software, playlist authoring software, or the like, to populate a playlist structure such as illustrated in FIG. 2. The playlist authoring method of the invention allocates playlist unit space between metadata and content (e.g., media files). For example, a playlist unit may include one media file reference and all metadata. In one embodiment, all of the playlist units have equal sizes derived from a sector size of the computer-readable medium storing the playlist units. For example, the playlist unit size may be 2048 bytes for a DVD medium.

The invention includes a computerized method for enabling efficient navigation of the playlist of media files as shown in FIG. 3. The computerized method aids user selection of the media files prior to rendering the media files. The computerized method includes identifying one or more media files associated with a playlist at 302 and defining media file references for the identified media files at 304. In one embodiment, defining the media file references includes defining pointers to each of the identified media files. The computerized method also includes retrieving metadata (e.g., via the defined media file references) corresponding to each of the identified media files at 306. The computerized method also includes storing the defined media file references and the retrieved metadata in one or more playlist units at 308. For example, the computerized method populates the playlist data structure of FIG. 2 with the defined media file references and the retrieved metadata. The playlist units collectively constitute the playlist.

The invention is not limited to a particular playlist authoring method. Various playlist authoring methods are within the scope of the invention. In a particular example, the playlist authoring method of the invention populates two playlist unit data structures simultaneously. When the size of one of the playlist unit data structures exceeds the playlist unit size, the method considers the other playlist unit to be a "full" playlist unit.

Another example of a playlist authoring method of the invention includes determining a quantity of playlist units to store the media file references and the retrieved metadata as a function of the size of each playlist unit. The method stores the media file references and the retrieved metadata in the determined quantity of playlist units. Another exemplary method for storing the media file references and the retrieved metadata includes successively storing at least a portion of the media file references and the retrieved metadata corresponding thereto in a first playlist unit until the playlist unit size has been reached. The method closes the first playlist unit, opens a second playlist unit, and successively stores at least a remaining portion of the media file references and the retrieved metadata corresponding thereto in the opened, second playlist unit.

In one embodiment, one or more computer-readable media have computer-executable instructions for performing the computerized method illustrated in FIG. 3.

Figure 4:
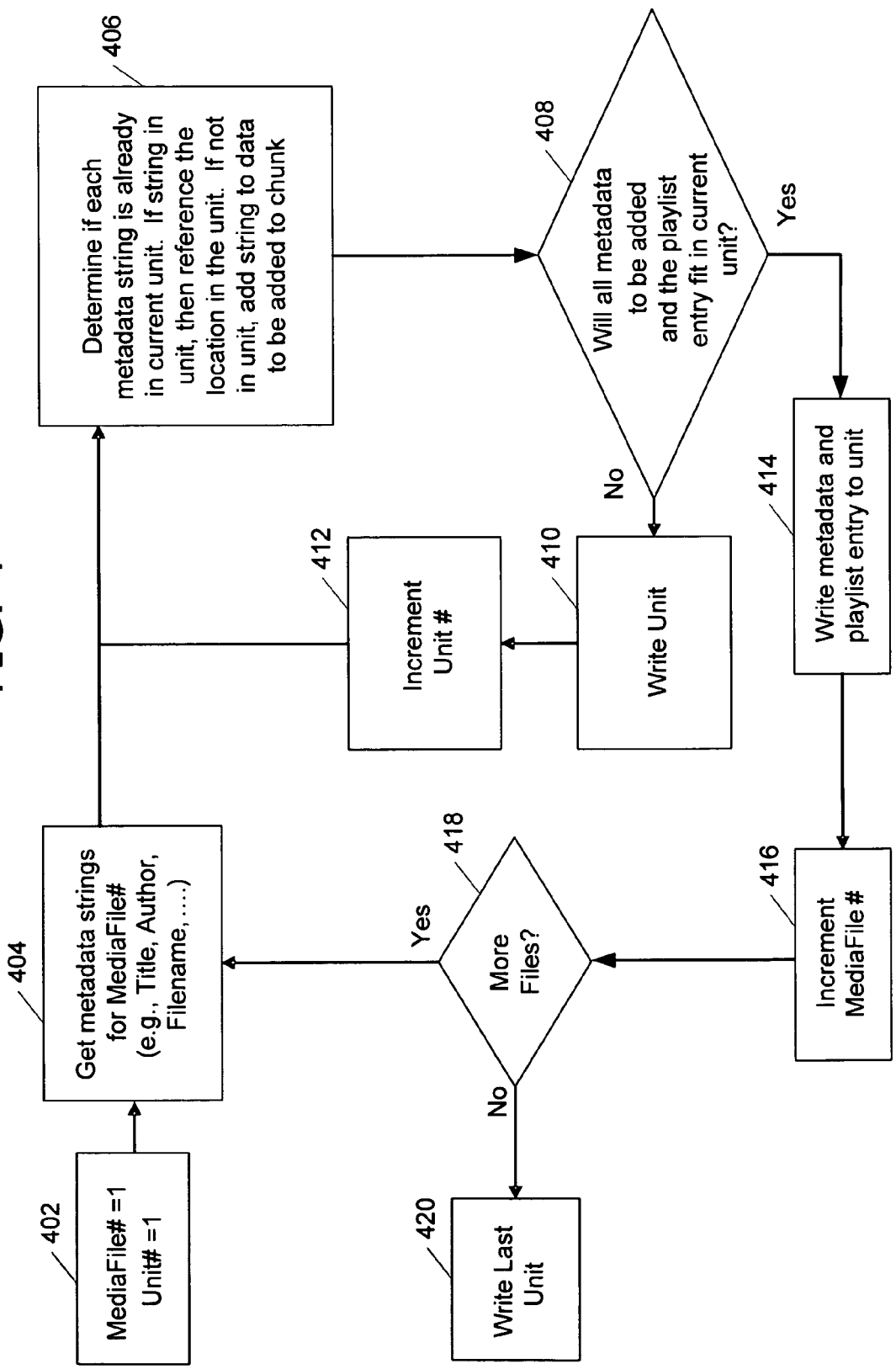
FIG. 4 is an exemplary flow chart illustrating creation of the playlist unit.

Referring next to FIG. 4, an exemplary flow chart illustrates creation of the playlist unit in one embodiment. At 402, a media file number and a playlist unit ("unit") number are set to one. The method in one embodiment obtains metadata strings for the media file corresponding to the current media file number at 404. For each metadata string, the method determines if the metadata string is already stored in the current playlist unit at 406. If so, then the location of the stored metadata string in the current playlist unit is noted (and subsequently stored at 414). If the obtained metadata string is not already stored in the current playlist unit at 406, then the metadata string is added to the metadata to be added to the current playlist unit (e.g., at 414). If the playlist entry data and the metadata to be added to the current playlist unit will fit in the current playlist unit at 408, the method writes the playlist entry data and the metadata to the current unit at 414. The media file number is incremented at 416 and a determination is made at 418 as to whether more files are to be processed. If more files are not to be processed, the method writes the last unit at 420. If more files are to be processed, metadata is obtained at 404 for the next media file to be processed. If the playlist entry data and the metadata to be added to the current playlist unit will not fit in the current playlist unit at 408, the method in this embodiment writes the unit at 410 (e.g., to the computer-readable medium), increments the unit number at 412, and then proceeds at 406.

Figure 5:
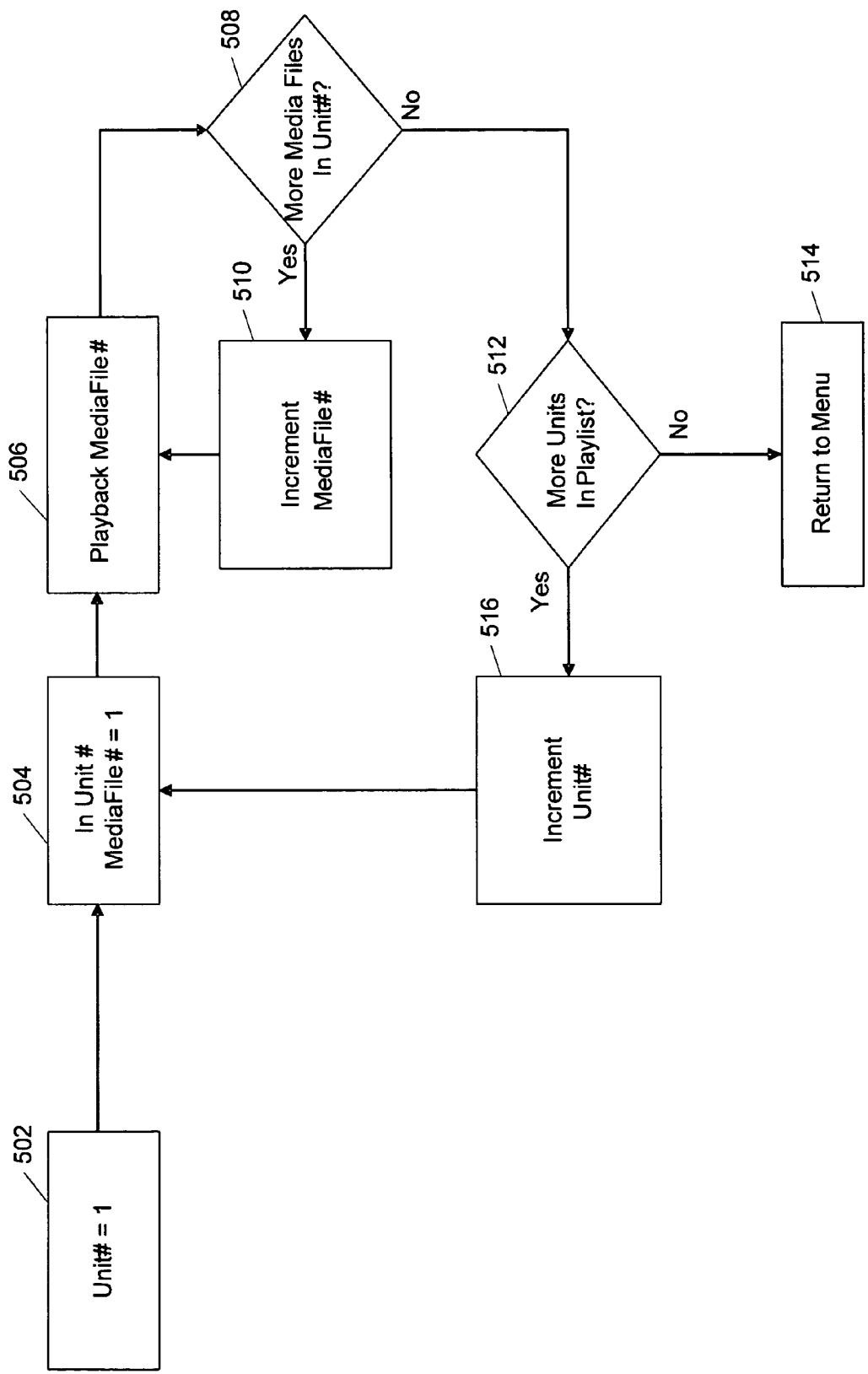
FIG. 5 is an exemplary flow chart illustrating playlist playback using the playlist unit.

Referring next to FIG. 5, an exemplary flow chart illustrates playlist playback using the playlist unit in one embodiment. The playlist unit number is set to one at 502. The media file number is set to one within the current unit at 504. The media file corresponding to the current media file number is rendered (e.g., played back) at 506. If there are more media files in the current playlist unit to play back at 508, the media file number is incremented at 510 and the next media file is played back at 506. If there are no more media files in the current playlist unit to play back at 508 and there are no more units in the playlist at 512, the method in one embodiment returns to the playlist menu at 514. If there are more units in the playlist at 512, the unit number is incremented at 516 and the method proceeds to reset the media file number to one for the current unit at 504.

Exemplary Operating Environment

Figure 6:
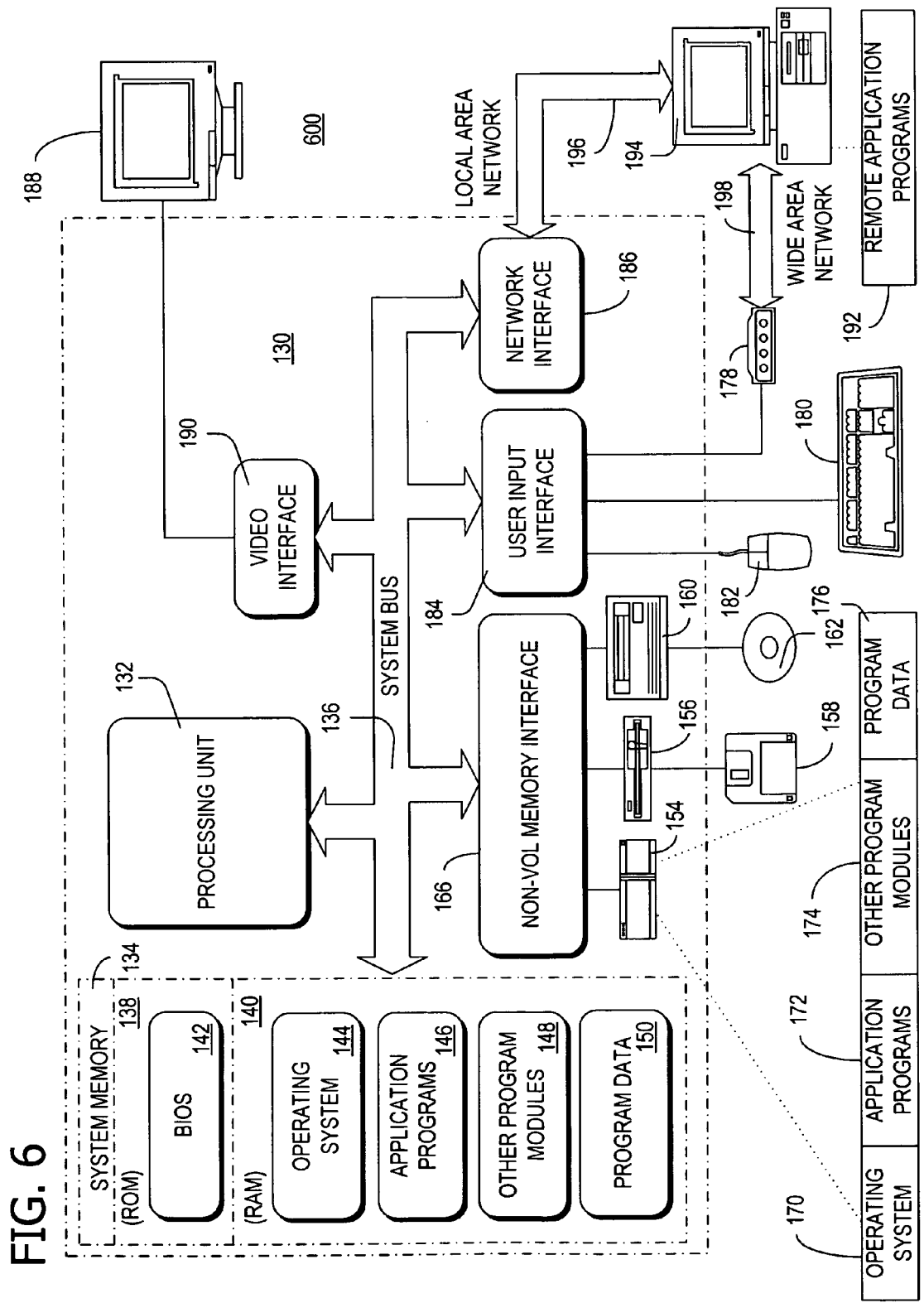
FIG. 6 is a block diagram illustrating one example of a suitable computing system environment in which aspects of the invention may be implemented.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in the figures to implement the invention.

The invention includes means for creating the playlist unit and means for populating the data structure. Hardware and software such as a data structure, a user interface, an application program, an application programming interface (API), computer-executable instructions, firmware, and the like (such as illustrated in the figures) constitute means for creating the playlist unit and means for populating the data structure.

In the examples described herein, the media content of the digital media file is described in the context of content embodied on a CD or a DVD. It is to be appreciated and understood that the media content may be embodied on any suitable media and that the specific examples described herein are given to further understanding of the inventive principles. For convenience, a digital media file refers to one or more files representing, for example, a single song track or a collection of tracks such as would be found on an audio CD. The media content may include, without limitation, specially encoded media content (e.g., audio, video, or still images) in the form of an encoded media file.

The exemplary media file operations illustrated in the drawings and described herein are merely exemplary. Other variations of these file operations are within the scope of the invention. Alternatively or in addition, other media file operations not described herein yet embodying the invention are also within the scope of the invention.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

APPENDIX A

An exemplary 'group data' field in the playlist structure and the playlist group objects therein in one embodiment of the invention are described below.

Group Data

Group Data includes a list of one or more Playlist Group Entries as defined below. Each Playlist Group Entry in the Group Data has different Group ID's and the Playlist Group Entries are stored in the Group Data in playback order.

TABLE A1

Playlist Group Entry.

| Offset | Length | Field Name |
|---|---|---|
| 0 | 2 | Previous Group Offset |
| 2 | 2 | Next Group Offset |
| 4 | 2 | Group Flags |
| 6 | 4 | Group ID |
| 10 | 2 | Offset to Group Name |
| 12 | 1 | Type of Playlist Group |
| 13 | 1 | Reserved |
| 14 | Var | Playlist Group Object |

Previous Group Offset

This 2-byte entry contains the byte offset from the beginning of the Playlist unit to the previous Playlist Group Entry in this Group Data. A value of zero indicates that this Playlist Group Entry is the first Group Entry in this Group Data.

Next Group Offset

This 2-byte entry contains the byte offset from the beginning of the Playlist unit to the next Playlist Group Entry in this Group Data. A value of zero indicates that this Playlist Group Entry is the last Group Entry in this Group Data.

Group Flags

This 2-byte summarizes the special attributes of this Playlist Group Entry. The following table illustrates the format of this field.

| 14 Bits | 2 Bits |
|---|---|
| RESERVED | Continued |
| 15 | 0 |

The continued flags allow players to easily find the starting and ending Playlist units for a Playlist Group without having to reference the Offset Group Table. Exemplary continued flags are shown below.

TABLE A2

Continued Flags.

| Continued Flags | Value |
|---|---|
| $00_b$ | GROUP IS CONTAINED IN THIS PLAYLIST UNIT |
| $01_b$ | GROUP IS CONTINUED IN NEXT PLAYLIST UNIT |
| $10_b$ | GROUP IS CONTINUED FROM PREVIOUS PLAYLIST UNIT |
| $11_b$ | GROUP IS CONTINUED FROM PREVIOUS PLAYLIST UNIT AND CONTINUED IN NEXT PLAYLIST UNIT |

Group ID

This 4-byte entry contains the ID of the Playlist Group.

Offset to Group Name

This 2-byte entry contains the byte offset from the beginning of the Playlist unit to the Text Data which contains the Group Name of the Playlist Group. Each Playlist Group Entry has a valid Text Entry for the Group Name.

Type of Playlist Group

This 1-byte entry represents the Type of the Playlist Group.

Reserved

This 1-byte entry is reserved for future use.

Playlist Group Object

This variable size entry contains all or part of the Playlist Group data. A Playlist Group is represented as the aggregate of one or more Playlist Group Objects. In the case that one Playlist Group includes more than one Playlist Group Object, the information for concatenating the Playlist Group Objects within the Playlist Group are indicated by the Group Flags. If a Playlist Group includes more than one Playlist Group Object, then the Playlist Group spans Playlist units. The number of Playlist Group Objects is equal to the number of Playlist units that contain Playlist Group Objects for this Playlist Group. Therefore, only one Playlist Group Object for a given Playlist Group is allowed in an individual Playlist unit, in one embodiment.

Audio Playlist Group Object

The order of the Audio File Indexes is the playback order for this Playlist Group Object.

TABLE A3

Audio Playlist Group Object.

| Offset | Length | Field Name |
|---|---|---|
| 0 | 4 | Number of Audio File Indexes |
| 4 | 4 | Audio File Index 1 |
| . | . | . |
| . | . | . |
| . | . | . |
| $4 + 4 * (n - 1)$ | 4 | Audio File Index n |

Number of Audio File Indexes

This 4-byte entry is the number of Audio Files Indexes that are listed in this Playlist Group Object.

Audio File Index

There is one 4-byte entry for each Audio File Index in this Playlist Group Object. The value is the Index of the Content Entry which references this Audio File in the Content Table. A value of one indicates the first Content Entry listed in the Content Table.

Video Playlist Group Object

The order of the Video File Indexes shall be the playback order for this Playlist Group Object.

TABLE A4

Video Playlist Group Object.

| Offset | Length | Field Name |
|---|---|---|
| 0 | 4 | Number of Video File Indexes |
| 4 | 4 | Video File Index 1 |
| 8 | 4 | Starting Point of Video 1 |
| 12 | 4 | Ending Point of Video 1 |
| 16 | 8 | Starting Point Offset 1 |
| 24 | 8 | Ending Point Offset 1 |
| . | | |
| . | | |
| . | | |
| 4 + 28 * (n − 1) | 4 | Video File Index n |
| 8 + 28 * (n − 1) | 4 | Starting Point of Video n |
| 12 + 28 * (n − 1) | 4 | Ending Point of Video n |
| 16 + 28 * (n − 1) | 8 | Starting Point Offset n |
| 24 + 28 * (n − 1) | 8 | Ending Point Offset n |

Number of Video File Indexes

This 4-byte entry is the number of Video File Indexes that are listed in this Playlist Group Object contained in this Playlist unit.

Video File Index

There is one 4-byte entry for each Video File Index in this Playlist Group Object. The value is the Index of the Content Entry which references this Video file in the Content Table. A value of one indicates the first Content Entry listed in the Content Table.

Starting Point of Video

There is one 4-byte entry for each Video File in this Playlist Group. The value is the offset in milliseconds to the starting time of the starting frame. The offset shall correspond to an I-frame within the Video File.

Ending Point of Video

There is one 4-byte entry for each Video File in this Playlist Group. The value is the offset in milliseconds to the starting time of the next frame of the ending frame. A value of zero indicates that the Video File should be played to the end of the file. When two sequential Video File Indexes in a Video Playlist Group indicate the same Video File, this is a special case intended for uninterrupted playback. Entries such as this allow 'chapters' to be created within a single Video File allowing the user to skip by chapter. During normal playback, the video plays without interruption as each chapter end where the next begins. Uninterrupted playback is only mandatory, in one embodiment, for 'chapters' contained within a single Playlist unit. Interruptions are allowed when a chapter spans Playlist unit boundaries.

Starting Point Offset

There is one 8-byte entry for each Video File in this Playlist Group. The value is the offset from the beginning of the Video File to the location a player may use to start reading the file. This offset is used with the Starting Point of Video field. If the Starting Point Video field is zero then this field is zero in which case the player will locate the first packet to read by examining the File Header. If the Starting Point of Video field is non-zero then this field contains the nearest location in the file to start decoding in order to reach the video starting time.

Ending Point Offset

There is one 8-byte entry for each Video File in this Playlist Group. The value is the offset from the beginning of the Video File to the location a player may use to stop reading the file. This offset is to be used with the Ending point of Video field. If the Ending Point of Video field is zero then this field is zero in which case the player will need to decide for itself where to stop reading the file. If the Ending Point of Video field is non-zero then this field contains the nearest location in the file to end reading to ensure all necessary data has been read.

Times Image Playlist Group Object

The order of the Image File Indexes is the playback order for this Playlist Group Object.

TABLE A5

Timed Image Playlist Group Object.

| Offset | Length | Field Name |
|---|---|---|
| 0 | 4 | Number of Image File Indexes |
| 4 | 2 | Initial Transition |
| 6 | 2 | Final Transition |
| 8 | 4 | Image File Index 1 |
| 12 | 4 | Duration 1 |
| 16 | 2 | Transition 1 |
| . | | |
| . | | |
| . | | |
| 8 + 10 * (n − 1) | 4 | Image File Index n |
| 12 + 10 * (n − 1) | 4 | Duration n |
| 16 + 10 * (n − 1) | 2 | Transition n |

Number of Image File Indexes

This 4-byte entry is the number of Image File Indexes that are listed in this Playlist Group Object.

Initial Transition

This 2-byte entry defines the initial transition to be used to display the first image in this Playlist Group Object. Exemplary values are CUT and FADE IN.

Final Transition

This 2-byte entry defines the final transition to be used to end the display of the last image in this Playlist Group Object. Exemplary values are CUT and FADE OUT.

Image File Index

There is one 4-byte entry for each Image File Index in this Playlist Group Object. The value is the Index of the Content Entry which references this Image file in the Content Table. A value of one indicates the first Content Entry listed in the Content Table.

Duration

This 4-byte entry is the duration to display the image in milliseconds after the image has been decoded; a value of zero represents infinity. In one embodiment, the minimum image duration in a Timed Image Playlist Group is 3 seconds (3000 milliseconds) and the maximum value is 0x001FFFFF.

Transition

This 2-byte entry defines the type of transition to use when the player changes to the next Image File. A value of zero is defined as CUT. A list of exemplary transitions is defined in the following table.

TABLE A6

Transition Type.

| Type of Entry | Value |
| --- | --- |
| 0 | CUT |
| 1 | FADE IN/FADE OUT |
| 2 | DISSOLVE |
| 3 | WIPE FROM TOP |
| 4 | WIPE FROM BOTTOM |
| 5 | WIPE FROM LEFT |
| 6 | WIPE FROM RIGHT |
| 7 | WIPE DIAGONAL LEFT |
| 8 | WIPE DIAGONAL RIGHT |
| 9-65,535 | RESERVED |

The duration of the transition is defined by each player. The duration of the transition should not affect the Image File duration. For example, a transition of 2 seconds duration between images of durations 20 and 30 seconds respectively should result in 19 seconds of the first image followed by 2 seconds of transition between the images followed by 29 seconds of the second image.

Parallel Image Audio Playlist Group Object

A Parallel Image Audio Playlist Group contains a list of Audio Files followed by a list of Image Files with transition and duration information. The list of Audio Files fits within the first Playlist that contains the Parallel Image Audio Playlist Group. The Audio section (e.g., the list of Audio Files and corresponding Content Entries and File Name/Text String data) does not span playlist units. The Images are considered the dominant files within this combination determining most aspects of playback while the audio us considered an accompaniment with no synchronization to the images.

TABLE A7

Parallel Image Audio Playlist Group Object.

| Length | Field Name |
| --- | --- |
| 4 | Number of Image File Indexes |
| 2 | Offset to Image Indexes |
| 2 | Initial Transition |
| 2 | Final Transition |
| 4 | Number of Audio File Indexes |
| 4 | Audio File Index 1 |
| . | |
| . | |
| . | |
| 4 | Audio File Index n |
| 4 | Image File Index 1 |
| 4 | Duration 1 |
| 2 | Transition 1 |
| . | |
| . | |
| . | |
| 4 | Image File Index m |
| 4 | Duration m |
| 2 | Transition m |

Number of Image File Indexes

This 4-byte entry is the number of Image File Indexes that are listed in this Playlist Group Object.

Offset to Image Indexes

This 2-byte entry is the offset from the beginning of this playlist unit to the first Image File Index. This value is zero if the first Image File Index is stored at the beginning of the next Playlist unit.

Initial Transition

This 2-byte entry defines the initial transition to be used to display the first image in this Playlist Group Object. Exemplary values are CUT and FADE IN.

Final Transition

This 2-byte entry defines the final transition to be used to end the display of the last image in this group Object. Exemplary values are CUT and FADE OUT.

Number of Audio File Indexes

This 4-byte entry is the number of Audio File Indexes that are listed in this Playlist Group Object. This field is zero in all Playlist units except for the first one that contains this Parallel Image Audio Playlist Group.

Audio File Indexes

This is one 4-byte entry for each Audi File Index in this Playlist Group Object. The value is the Index of the Content Entry which references this Audio File in the Content Table. A value of one indicates the first Content Entry listed in the Content Table.

Image File Index

There is one 4-byte entry for each Image File Index in this Playlist Group Object. The value is the Index of the Content Entry which references this Image file in the Content Table. A value of one indicates the first Content Entry listed in the Content Table.

Duration

This 4-byte entry is the duration to display the image in milliseconds after the image has been decoded; a value of zero represents infinity. In one embodiment, the minimum image duration in a Timed Image Playlist Group is 3 seconds (3000 milliseconds) and the maximum value is 0x001FFFFF.

Transition

This 2-byte entry defines the type of transition to use when the player changes to the next Image File. A value of zero is defined as CUT.

What is claimed is:

1. A computerized method for enabling efficient navigation of a playlist of media files stored on a computer-readable medium, said computerized method comprising:
identifying one or more media files associated with a playlist;
defining media file references for the identified media files;
retrieving metadata corresponding to each of the identified media files; and
storing the defined media file references and the retrieved metadata in a plurality of playlist units representative of the playlist to aid user selection of the media files prior to rendering the media files, wherein storing the media file references and the retrieved metadata comprises storing the media file references and the retrieved metadata on a computer-readable medium in the plurality of playlist units, each of said playlist units having a size derived from a sector size associated with the computer-readable medium, wherein at least two of the plurality of playlist units include media file references, and wherein all of the retrieved metadata corresponding to each of the identified media files is stored in the same playlist unit as the defined media file reference for the identified media file.

2. The computerized method of claim 1, wherein each of the playlist units has a size limit associated therewith, and wherein storing the media file references and the retrieved metadata comprises:

determining a quantity of playlist units to store the media file references and the retrieved metadata as a function of the size limit; and storing the media file references and the retrieved metadata in the determined quantity of playlist units.

3. The computerized method of claim 1, wherein each playlist unit has a size limit associated therewith, and wherein storing the media file references and the retrieved metadata comprises:

successively storing at least a portion of the media file references and the retrieved metadata corresponding thereto in a first playlist unit until the size limit has been reached;

closing the first playlist unit;

opening a second playlist unit; and successively storing at least a remaining portion of the media file references and the retrieved metadata corresponding thereto in the opened, second playlist unit.

4. The computerized method of claim 1, further comprising:

receiving one of the playlist units; and displaying a portion of the metadata stored within the received playlist unit to a user to enable user selection of a media file associated therewith.

5. The computerized method of claim 4, further comprising:

receiving a media file selection from the user; and rendering the media file associated with the received media file selection via the media file reference associated with the media file selection.

6. The computerized method of claim 1, wherein retrieving the metadata comprises retrieving the metadata from the media files via the media file references.

7. The computerized method of claim 1, wherein defining the media file references for the identified media files comprises defining a pointer to each of the identified media files.

8. The computerized method of claim 1, wherein all of the playlist units have an equal size.

9. The computerized method of claim 1, wherein each of the playlist units occupies 2048 bytes of memory.

10. The computerized method of claim 1, wherein one or more computer-readable storage media have computer-executable instructions configured to perform the computerized method of claim 1.

11. One or more computer-readable storage media having computer-executable components for navigating a playlist having a plurality of media files associated therewith, said components comprising:

a playlist component means for retrieving one of a plurality of playlist units stored in a memory area, the playlist units collectively representing a playlist, wherein each of the playlist units has a size derived from a sector size associated with the memory area, and wherein at least two of the plurality of playlist units include metadata describing at least one of the plurality of media files associated with the playlist;

a parser component means for obtaining metadata stored within the playlist unit retrieved by the playlist component, said metadata describing a media file associated with the playlist, wherein all of the metadata describing the media file is stored in the playlist unit and wherein all of the metadata for any of the plurality of media files is stored in a single playlist unit;

a user interface component means for displaying, to a user, the metadata obtained by the parser component and receiving a media file selection from the user; and a playback component means for rendering the selected media file to the user.

12. The computer-readable storage media of claim 11, wherein all of the playlist units have equal sizes.

13. A computerized system for enabling efficient navigation of a playlist of media files stored on a computer-readable medium, said computerized system comprising:

a memory area storing a data structure representing a playlist, said data structure comprising a plurality of playlist units, wherein each of the playlist units has a size derived from a sector size associated with the memory area, each of said playlist units comprising:

a content entry field for each of the media files associated with the playlist unit, said content entry field storing a media file reference identifying a location of the media file; and a metadata field for each content entry field, said metadata field storing metadata associated with the media file associated with the content entry field, wherein all of the metadata associated with the media file is stored in said metadata field of said playlist unit; and a processor configured to execute computer-executable instructions that:

identify one or more media files associated with a playlist;

define media file references for the identified media files;

retrieve metadata corresponding to each of the identified media files; and populate the data structure stored in the memory area with the defined media file references and the retrieved metadata to aid user selection of the media files prior to rendering the media files.

14. The computerized system of claim 13, wherein each of the playlist units further comprises a directory field for storing one or more directory paths associated with the media files in the playlist unit.

15. The computerized system of claim 13, wherein each of the playlist units further comprises a header field for storing an offset to another playlist unit.

16. The computerized system of claim 13, further comprising means for creating the playlist unit.

17. The computerized system of claim 13, further comprising means for populating the data structure.

18. The computerized system of claim 13, farther comprising a rendering device for:

receiving one of the playlist units;

retrieving metadata from the received playlist unit, said metadata corresponding to a media file in the playlist;

displaying the retrieved metadata to a user;

receiving a media file selection from the user; and rendering the selected media file to the user.

* * * * *

UNITED STATES PATENT AND TRADEMARK OFFICE
CERTIFICATE OF CORRECTION

| | | |
|---|---|---|
| PATENT NO. | : 7,668,842 B2 | Page 1 of 1 |
| APPLICATION NO. | : 11/168060 | |
| DATED | : February 23, 2010 | |
| INVENTOR(S) | : Kevin Leigh LaChapelle et al. | |

It is certified that error appears in the above-identified patent and that said Letters Patent is hereby corrected as shown below:

In column 8, line 35, after "identifier" insert -- for --.

In column 8, line 59, after "type'" insert -- field --.

In column 15, line 57, after "2-byte" insert -- entry --.

In column 17, line 67, after "Point" insert -- of --.

In column 19, line 29, after "first Playlist" insert -- unit --.

In column 20, line 7, after "this" insert -- Playlist --.

In column 22, line 51, in Claim 18, delete "farther" and insert -- further --, therefor.

Signed and Sealed this
First Day of February, 2011

David J. Kappos
*Director of the United States Patent and Trademark Office*